United States Patent [19]

Andre et al.

[11] Patent Number: 5,066,763
[45] Date of Patent: Nov. 19, 1991

[54] MONOEPOXIDE-POLYOL ADDUCTS AND PROCESS FOR PREPARING THE SAME

[75] Inventors: Olivier L. P. Andre; Henricus P. H. Scholten, both of Louvain-la-Neuve, Belgium

[73] Assignee: Shell Oil Company, Houston, Tex.

[21] Appl. No.: 539,415

[22] Filed: Jun. 13, 1990

[30] Foreign Application Priority Data

Jun. 20, 1989 [GB] United Kingdom ............... 8914161

[51] Int. Cl.$^5$ ...................... C08G 59/68; C08G 65/10
[52] U.S. Cl. ........................................ 528/92; 477/386
[58] Field of Search ................ 427/386; 528/79, 76, 528/250, 256, 163, 164, 92

[56] References Cited

U.S. PATENT DOCUMENTS

| | | | |
|---|---|---|---|
| 2,933,459 | 4/1960 | Gurgiolo | 260/2 |
| 3,536,634 | 10/1970 | Vandenberg | 528/92 |
| 3,716,402 | 2/1973 | Hicks | 427/386 |
| 4,112,231 | 9/1978 | Weibull et al. | 544/174 |
| 4,149,987 | 4/1979 | Austin et al. | 528/79 |
| 4,228,249 | 10/1980 | Blahak et al. | 528/64 |
| 4,282,387 | 8/1981 | Olstowski et al. | 568/618 |
| 4,285,849 | 8/1981 | Dowbenko et al. | 427/386 |
| 4,323,657 | 4/1982 | Mazanek et al. | 525/80 |
| 4,326,047 | 4/1982 | Yates | 525/507 |
| 4,405,763 | 9/1983 | Kooymans et al. | 528/92 |
| 4,405,765 | 9/1983 | Demmler et al. | 525/506 |
| 4,638,021 | 1/1987 | Ando et al. | 523/457 |
| 4,755,583 | 7/1988 | Scholten et al. | 528/110 |
| 4,888,365 | 12/1989 | Riley et al. | 528/79 |

FOREIGN PATENT DOCUMENTS

| | | |
|---|---|---|
| 2626-579-A | 8/1989 | France . |
| 2626579 | 8/1989 | France . |
| 1531778 | 9/1976 | United Kingdom . |

Primary Examiner—Michael Lusignan
Assistant Examiner—Diana L. Dudash

[57] ABSTRACT

An adduct of:
a) one or more polyhydric alcohols of formula $R(OH)_n$ in which R is an aliphatic or heterocyclic moiety of from 2 to 18 carbon atoms, the hydroxyl groups are attached to a primary carbon atom, or a secondary carbon atom in which the second hydroxyl group is attached to a carbon atom no more than 4 carbon atoms away from said secondary carbon atom, and n is an integer of from 2 to 6, and
b) an at least equimolar amount of one or more monoepoxides of formula

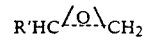

in which R' is an optionally substituted aromatic moiety of up to 14 carbon atoms, said adduct having a molecular weight distribution Mz/Mw of from 1 to 1.1, and a process for preparing the same.

26 Claims, No Drawings

MONOEPOXIDE-POLYOL ADDUCTS AND PROCESS FOR PREPARING THE SAME

BACKGROUND OF THE INVENTION

This invention relates to adducts of a polyhydric alcohol and a monoepoxide and to a process for preparing the same. In a specific aspect, the invention relates to a process for the preparation of an adduct of a polyhydric alcohol and an aromatic monoepoxide and to curable coating compositions containing such adducts. In another aspect, the invention relates to a process for coating a surface by applying said coating composition.

Resinous polyhydric polyether adducts are well-known useful materials, for example, in the solvent, foam and coating industries. In general, they offer good properties and are more chemically resistant than polyhydric polyester resins in coatings. For example, GB-A-1,531,778 describes preparation of polyetheralcohols used in the preparation of polyurethane foam by the addition of an epoxide (ethylene oxide, propylene oxide) to an at least divalent alcohol, such as glycerol or pentaerythritol, and polyethylene glycol in the presence of alkaline catalysts.

Other examples for the preparation of these adducts are found in U.S. Pat. No. 4,282,387 and U.S. Pat. No. 4,326,047. U.S. Pat. No. 4,282,387 describes a reaction of a monoepoxide (propylene oxide) and at least one active hydrogen containing compound catalyzed by a calcium, barium or strontium containing catalyst; U.S. Pat. No. 4,326,047 describes preparation of polyether hydroxyl-containing compounds (using propylene oxide) in the presence of a solid calcium naphthenate.

However, none of the above references addresses the desirability of preparing a monoepoxide-polyhydric alcohol adduct having a relatively low viscosity (i.e., free of highly polymerized compounds) while containing a lesser amount of unreacted starting materials, a product with a narrow molecular weight distribution. In particular, these processes do not provide adducts of an aromatic monoepoxide and a polyhydric alcohol.

Therefore, it is an object of the invention to provide for adducts of aromatic monoepoxides and polyhydric alcohols. It is another object of the invention to provide for a process to obtain such adducts with a narrow molecular weight distribution.

BRIEF SUMMARY OF THE INVENTION

According to the invention, there is provided an adduct of:

a) one or more polyhydric alcohols of formula $R(OH)_n$ in which R is an aliphatic or heterocyclic moiety of from 2 to 18 carbon atoms, the hydroxyl groups are attached to a primary carbon atom, or a secondary carbon atom in which the second hydroxyl group is attached to a carbon atom no more than 4 carbon atoms away from said secondary carbon atom, and n is an integer of from 2 to 6, and b) an at least equimolar amount of one or more monoepoxides of formula

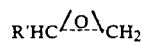

in which R' is an optionally substituted aromatic moiety of up to 14 carbon atoms, said adduct having a molecular weight distribution Mz/Mw of from 1 to 1.2, and a process for preparing the same.

DETAILED DESCRIPTION OF THE INVENTION

It was found that these adducts could be very advantageous in coating compositions, as they provide low viscosity resins and impart hardness and resistance against most chemical compounds.

For high solids applications, a low concentration of free residual reactants and a narrow molecular weight distribution Mz/Mw (MWD) ranging from 1 to 1.15 is preferred, while a MWD ranging from 1 to 1.1 is even more preferred. The molecular weight distribution may be determined by gel permeation chromatography as is known in the art.

Mz and Mw are commonly used molecular weight averages obtained by different averaging methods referred to as "weight" and "z" and are based on ratios of successively higher moments of the molecular weight distribution.

Suitable monoepoxides can be represented by the formula

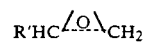

in which R' is an unsubstituted or substituted aromatic moiety of up to 14 carbon atoms. The R' moiety of each monoepoxide that is part of the adduct can be an aromatic moiety containing herero atoms such as phenyl, naphthyl, anthryl, pyridyl, furyl, and thienyl, for example. Preferably, the R' moiety is a phenyl, optionally bearing inert substituents, such as xylyl, mesityl, bromophenyl, chlorophenyl, or nitrophenyl. Most preferably the R' moiety is phenyl.

Polyhydric alcohols can be represented by the formula $R(OH)_n$ in which R is an aliphatic or heterocyclic moiety of from 2 to 18 carbon atoms, the hydroxyl groups are attached to a primary carbon atom, or a secondary carbon atom in which the second hydroxyl group is attached to a carbon atom no more than 4 carbon atoms away from said secondary carbon atom, and n is an integer of from 2 to 6. Polyhydric alcohols in which the hydroxyl groups are attached to a secondary hydroxyl group wherein the nearest hydroxyl group is more than 4 carbon atoms away, such as 2,6-octylene glycol, are less suitable because they show no or very little reactivity.

Suitable polyhydric alcohols from which the adducts of the present invention may be obtained include low molecular weight polyols such as glycols, glycerines, modified sugars and starches, and tris(hydroxyalkyl)isocyanurates and the like. Particularly suitable glycols are any or more of for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, and 2,2-dimethyl-1,3-propylene glycol and the like. Most suitable glycols are selected from any or more having the primary or secondary hydroxyl groups in beta or gamma position relative to each other, such as for instance ethylene glycol, 1,2- and 1,3-propylene glycol.

Particularly suitable low molecular weight polyols are selected from any or more of the isomers corresponding to tris(hydroxymethyl)ethane, -propane, -butane, -pentane, -hexane, -heptane, -octane, and -nonane; tetra(hydroxymethyl)methane, -ethane, -propane, -butane, -pentane, -hexane, -heptane, and -octane; penta(hydroxymethyl)ethane, -propane, -butane, -pentane, -hexane, and -heptane; and hexa(hydroxymethyl)ethane, -propane, -butane, -pentane, and -hexane.

Other particular suitable polyhydric alcohols are modified sugars and starches, i.e., those having more than one primary hydroxyl group, and heterocyclic compounds such as tris(hydroxyethyl)isocyanurate (THEIC) and the like.

Also particularly suitable are the dimers or ethylene oxide modified derivatives of the compounds above, provided that the total number of hydroxyl groups is up to 6, and the total number of carbon atoms is up to 18. The term "aliphatic polyhydric alcohol" as used throughout this application also includes aliphatic alcohols having one or more non-conjugated unsaturated links.

According to a preferred embodiment, the sole polyhydric alcohol or mixtures thereof are selected from primary polyhydric alcohols. In a more preferred embodiment the primary polyhydric alcohols are selected from ethylene glycol, 2,2-dimethyl-1,3-propanediol (i.e., neopentyl glycol or NPG), tris(hydroxymethyl)propane (i.e., trimethylolpropane or TMP), THEIC, or the dimer of TMP (DTMP). The most preferred primary polyhydric alcohol is TMP.

The present invention also provides for a process for preparing said adducts, which process comprises the contacting of:
a) one or more polyhydric alcohols of formula R(OH)$_n$ in which R is an aliphatic or heterocyclic moiety of from 2 to 18 carbon atoms, the hydroxyl groups are attached to a primary carbon atom, or a secondary carbon atom in which the second hydroxyl group is attached to a carbon atom no more that 4 carbon atoms away from said secondary carbon atom, and n is an integer of from 2 to 6, and
b) an at least equimolar amount of one or more monoepoxides of formula

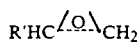

in which R' is an optionally substituted aromatic moiety of up to 14 carbon atoms,
in the presence of an etherification catalyst selected from tin, zinc and iron compounds.

It was found as result of extensive research and experimentation that by proper choice of the etherification catalyst, high yields of low viscosity well-defined adducts were obtained containing a lesser amount of both unreacted starting material and (highly) polymerized product in a most expedient manner, as is evident from the very narrow molecular weight distribution (MWD).

These selective etherification catalysts are known in the field of preparation of polyepoxy polyether resins (cf. EP-A-0,244,897). However, it was previously unknown that they provide both high selectivity and reactivity for the etherification of aromatic monoepoxides, such reactivity not being found in the case of aliphatic epoxides, and aliphatic and aromatic monoglycidyl ethers.

Suitable examples of etherification catalysts include halides, and salts of alkanoic and naphthenic acids, particularly of those having in the range of from 2 to 30 carbon atoms per molecule. More suitable catalysts include tin, zinc or iron chlorides, tin or zinc alkanoates, dibutyltin dialkanoates, and iron salts of naphthenic acids. Preferred catalysts are tin(II)octoate, tin dichloride, dibutyltin dilaurate and tin tetrachloride, the former being most preferred.

The catalyst may be employed at relatively low concentrations and low reaction temperatures. Thus, addition of about 0.01 to about 0.5% m/m of catalyst while heating the reaction mixture to a temperature within the range of from about 100° to about 220° C. is adequate. Particularly suitable concentrations of catalyst range from about 0.03 to about 0.35% m/m, most suitably from about 0.05 to about 0.2% m/m. The reaction may suitably be carried out at a temperature within the range of from about 115° to about 190° C., preferably from about 130° to about 180° C., most preferably from about 150° to about 175° C.

Preferably, the relative amounts of starting materials a) and b) are such that the final adduct, reaction product, contains essentially no free starting alcohol at essentially complete conversion of the monoepoxide. Hence, the preferred relative amounts expressed in equivalents hydroxyl group per equivalent epoxy groups range from m to 0.8, more preferably of from (0.5n+0.6) to 1.1, most preferably of from 1.6 to 1.2, wherein m corresponds with the (average) number of hydroxyl groups in the (mixture of) polyhydric alcohol(s).

The invention adducts can be suitably used in polyurethane resin preparation and high-performance automotive high solids top coatings. The latter coatings preferably further comprise one or more crosslinking resins, and little or no solvents. Also said coatings preferably comprise one or more catalysts, optionally together with an accelerator. Attractive crosslinking resins in the latter respect are, for example, those disclosed in U.S. Pat. No. 4,755,583. Particularly suitable crosslinking agents are the aminoplast-type resins, such as alkoxylated reaction products of formaldehyde with melamine or benzoguanimide. Other suitable crosslinking agents include urea-aldehyde resins, phenol-aldehyde resins, and blocked polyisocyanates. Suitable catalysts which may be employed in the curable coating compositions are acids such as orthophosphoric acid or p-toluenesulfonic acid. These catalysts may be used in a concentration range of from, for example, about 0.05 to about 2% by weight, calculated on polyether and crosslinking resin.

The relative proportions of adduct and crosslinking resin are those generally employed in the curable binders, typically of from about 5 to about 40% of crosslinking resin by weight, calculated on the total of adducts of the present invention and crosslinking resin.

The invention adducts are primarily intended to be employed in top coatings. Other applications such as in the preparation of polyurethanes, as solvents, or in the preparation of laminates or castings are also possible. The adducts may be blended with conventional solvents such as aliphatic or aromatic hydrocarbons, optionally being halogenated.

Pigments, fillers, dispersing agents and other auxiliary components known for coating formulations can be added to the curable binder system comprising the adducts made in accordance with the process of this invention.

The curable coating composition can be applied by a variety of known methods, for example by spraying, dipping, immersing or roller coating. The coatings can be cured by stoving, for example at temperatures from about 75° to about 300° C., with curing temperatures varying from, for example, about 10 seconds to about 30 minutes.

The invention will be further illustrated by the following examples, without restricting its scope to these embodiments.

EXAMPLES

Experiments were carried out in a 1 liter glass reactor equipped with a stainless steel stirrer, nitrogen inlet, heating jacket, a thermocouple and a reflux condenser.

One of the alcohols listed below and styrene epoxide (PhEp) were charged into the reactor and homogenized by gradually increasing the temperature.

| Alcohols | Abbreviation | M.W. | H.F.* |
|---|---|---|---|
| Neopentyl glycol | NPG | 104 | 2 |
| Trimethylolpropane | TMP | 134 | 3 |
| Tris(hydroxyethyl)isocyanurate | THEIC | 261 | 3 |
| Di(trimethylolpropane) | DTMP | 250 | 4 |

*H.F. is the hydroxyl functionality of the polyhydric alcohol.

When the system was homogenized, normally at about 100° C., a catalyst was added. Then, the reactor was heated to the reaction temperature indicated in Table 1. The reaction was followed by withdrawing samples at regular intervals and determining the decreasing epoxy group content (EGC) value. When 99% of the epoxide groups had reacted, the reaction was stopped by cooling. Experimental data are summarized in Table 1.

TABLE 1

| | Intake (g) | | | Time of | | | free | |
|---|---|---|---|---|---|---|---|---|
| | alc. | PhEp | Sn(II) octoate | Temp. (°C.) | reaction (h.) | MWD Mz/Mw | Mz | alc. % m/m | EGC meq/g |
| TMP | 67 | 120 | 0.44 | 175 | 1.8 | 1.05 | 470 | 6 | 0.07 |
| NPG | 104 | 160 | 0.46 | 175 | 2.5 | 1.05 | 410 | 10 | 0.07 |
| THEIC | 111 | 102 | 0.48 | 175 | 8.0 | 1.07 | 470 | 6 | 0.08 |
| DTMP | 187 | 240 | 0.90 | 175 | 11.0 | 1.05 | 590 | 2 | 0.07 |

The adducts (except for the THEIC adduct) were further evaluated in coating formulations comprising the following compositions:

| Coating composition (80% solid content) | I (g) | II (g) |
|---|---|---|
| Adduct | 40.0 | 35.0 |
| Hexamethoxymethylmelamine, "HMMM" | 10.0 | 15.0 |
| Xylene | 12.5 | 12.5 |
| para-toluenesulfonic acid (10% in butyl OXITOL; OXITOL is a registered trademark) | 1.5 | 1.5 |

The clear lacquer was applied onto a bare steel panel in a dry film thickness of approximately 35 μm. The panel was stoved at a temperature of 140° C. for 30 minutes, after which the lacquer properties were assessed (Table 2).

TABLE 2

| Alc. | Composition | Viscosity[1] mPa.s | thickness (μm) | MEK (dbl. rubs) | Hardness[2] (sec) |
|---|---|---|---|---|---|
| TMP | I | | 35 | 40 | 183 |
| | II | 2740 | 35 | >100 | 178 |
| DTMP | I | | 38 | >100 | 190 |

TABLE 2-continued

| Alc. | Composition | Viscosity[1] mPa.s | thickness (μm) | MEK (dbl. rubs) | Hardness[2] (sec) |
|---|---|---|---|---|---|
| | II | 6030 | 35 | >100 | 180 |
| NPG | I | | 32 | >100 | 188 |
| | II | 546 | 35 | >100 | 136 |
| | II | 546 | 35 | >100 | 136 |

[1]Viscosity determined for a 90% solids composition.
[2]Konig hardness determined using a Erichsen apparatus.

We claim:
1. A curable coating composition comprising:
(1) an adduct prepared by reacting, in the presence of an etherification catalyst selected from tin, zinc, and iron compounds:
a) at least one polyhydric alcohol of formula $R(OH)_n$ in which R is an aliphatic or heterocyclic moiety of from 2 to 18 carbon atoms, the hydroxyl groups are attached to a primary carbon atom or a secondary carbon atom in which the second hydroxyl group is attached to a carbon atom no more than 4 carbon atoms away from said secondary carbon atom, and n is an integer of from 2 to 6, and
b) at least an equimolar amount of at least one monoepoxide of formula

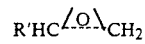

in which R' is an unsubstituted or substituted aromatic moiety of up to 14 carbon atoms,
said adduct having a molecular weight distribution Mz/Mw within the range of 1 to 1.1; and
(2) an effective amount of a crosslinking resin to cure the adduct.
2. The composition of claim 1 wherein R' is a phenyl group optionally bearing inert substituents.
3. The composition of claim 2 wherein R' is a phenyl group.
4. The composition of claim 1 in which the polyhydric alcohol is selected from the group consisting of glycols, low molecular weight polyols, glycerines, modified sugars, modified starches, and tris(hydroxyalkyl)-isocyanurates.
5. The composition of claim 4 wherein the polyhydric alcohol is primary polyhydric alcohol.
6. The composition of claim 5 wherein the primary polyhydric alcohol is selected from ethylene glycol, neopentyl glycol, trimethylolpropane, di-trimethylolpropane, and tris(hydroxyethyl)isocyanurate.
7. The composition of claim 5 wherein the primary polyhydric alcohol is trimethylolpropane.
8. The composition of claim 1 further comprising (c) a acid catalyst.
9. The composition of claim 1 wherein the crosslinking resin is selected from the group consisting of aminoplast resins, phenol-aldehyde resins and blocked polyisocyanates.

10. The composition of claim 9 in which the crosslinking resin is present in an amount of from about 5 to about 40 weight percent, based on the weight of the adduct and the crosslinking resin.

11. A process for preparing an adduct of a polyhydric alcohol and a monoepoxide, said adduct having a molecular weight distribution Mz/Mw within the range of about 1 to about 1.1, the process comprising:
contacting (i) at least one polyhydric alcohol of formula $R(OH)_n$ in which R is an aliphatic or heterocyclic moiety of from 2 to 18 carbon atoms, the hydroxyl groups are attached to a primary carbon atom or a secondary carbon atom in which the second hydroxyl group is attached to a carbon atom no more than 4 carbon atoms away from said secondary carbon atom, and n is an integer of from 2 to 6, and (ii) at least an equimolar amount of at least one monoepoxide of formula

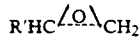

in which R' is an unsubstituted or substituted aromatic moiety of up to 14 carbon atoms; in the presence of an etherification catalyst selected from the group consisting of halide salts, alkanoic acid salts and naphthenic acid salts of metals of the group consisting of tin, zinc and iron.

12. The process of claim 11 wherein the relative amounts of polyhydric alcohol and monoepoxide expressed in equivalents of hydroxyl groups per equivalent of epoxy groups range from m to 0.8 wherein m is the average number of hydroxyl groups in the polyhydric alcohol.

13. The process of claim 12 wherein the relative amounts range from (0.5 m +0.6) to 1.1 wherein m is the average number of hydroxyl groups in the polyhydric alcohol.

14. The process of claim 13 wherein the relative amounts range from 1.6 to 1.2.

15. The process of claim 11 wherein the etherification catalyst is selected from chloride salts of tin, zinc or iron, tin or zinc alkonoates, dibutyltin(IV)alkanoates, and iron naphthenates.

16. The process of claim 15 wherein the etherification catalyst is selected from the group consisting of tin-(II)octoate, tin dichloride, dibutyltin dilaurate and tin tetrachloride.

17. The process of claim 11 wherein the etherification catalyst is tin(II)octoate.

18. The process of claim 15 wherein the etherification catalyst is present in an amount within the range of from about 0.01 to about 0.5% m/m.

19. The process of claim 18 which is carried out at a temperature within the range from about 115° to about 190° C.

20. An adduct which is the product of the process of claim 11.

21. An adduct which is the product of the process of claim 16.

22. A curable coating composition comprising the composition of claim 20 and a crosslinking resin.

23. The composition of claim 22 in which the crosslinking resin is present in an amount of from about 5 to about 40 weight percent, based on the weight of the adduct and the crosslinking resin.

24. A process for coating a surface comprising the steps of:
(a) applying to the surface a curable coating composition comprising (i) a crosslinking resin, (ii) an adduct having a molecular weight distribution Mz/Mw within the range of 1 to 1.2 of (A) one or more polyhydric alcohols of formula $R(OH)_n$ in which R is an aliphatic or heterocyclic moiety of from 2 to 18 carbon atoms, the hydroxyl groups are attached to a primary carbon atom or a secondary carbon atom in which the second hydroxyl group is attached to a carbon atom no more than 4 carbon atoms away from said secondary carbon atom, and n is an integer of from 2 to 6, and (B) at least an equimolar amount of one or more monoepoxides of formula

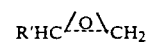

in which R' is an unsubstituted or substituted aromatic moiety of up to 14 carbon atoms, and (iii) an acid catalyst; and
(b) heating the composition at a temperature within the range of about 75° to about 300° C. for time effective to cure the coating composition.

25. The process of claim 24 in which the acid catalyst is present in the coating composition in an amount of about 0.05 to about 2 weight percent.

26. The process of claim 24 wherein the acid catalyst is selected from the group consisting of orthophosphoric acid and para-toluenesulfonic acid.

* * * * *